July 23, 1935. H. A. SAUER 2,008,994
FILM MAGAZINE
Filed Aug. 1, 1931
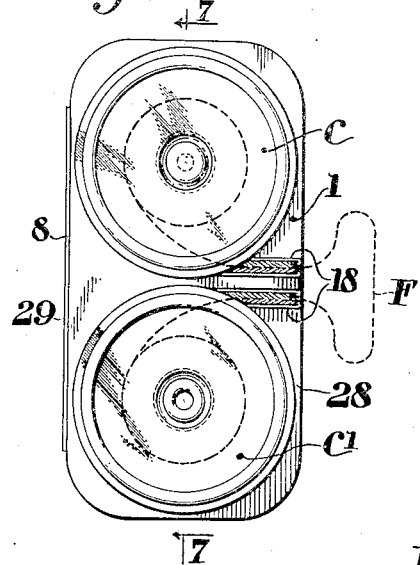
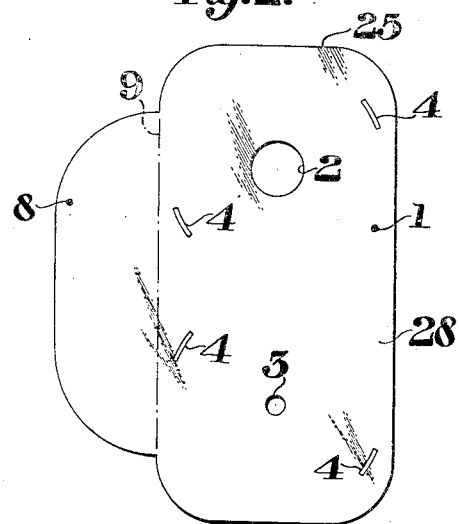
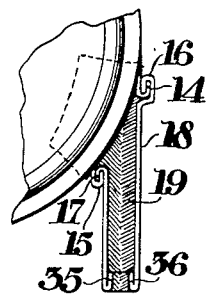
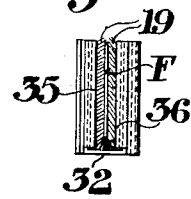
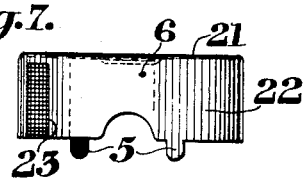
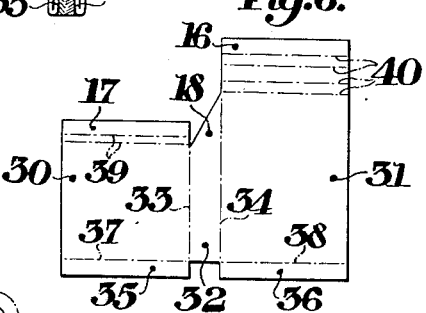
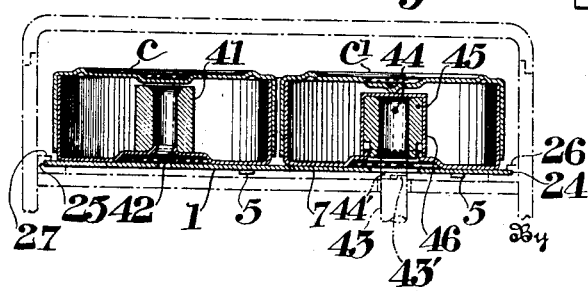
Inventor:
Howard A. Sauer,
Donald H. Stewart,
Newton N. Perrin
By
Attorneys.

Patented July 23, 1935

2,008,994

UNITED STATES PATENT OFFICE 2,008,994

FILM MAGAZINE

Howard A. Sauer, Rochester, N. Y., assignor to Eastman Kodak Company, Rochester, N. Y., a corporation of New York Application August 1, 1931, Serial No. 554,453

6 Claims. (Cl. 88—17)

This invention relates to film magazines and particularly to film magazines adapted to contain film for amateur cameras. One object of my invention is to provide a magazine which is simple to construct and economical to build. Another object of my invention is to provide a magazine with a locating plate adapted to position the magazine in a suitable camera. Another object of my invention is to provide a film magazine with totally separate containers for the unexposed and for the exposed film. Another object of my invention is to provide a magazine with film containers attached to a plate having edges shaped to cooperate with walls of a camera to position the magazine therein. Still another object of my invention is to provide a film magazine comprising film containers mounted on a plate two edges of which form runners adapted to engage a track in a camera to position the film magazine and other objects will appear from the following specification, the novel features being particularly pointed out in the claims at the end thereof.

Coming now to the drawing in which like characters denote like parts throughout:

Fig. 1 is a plan view of a magazine constructed in accordance with and embodying a preferred form of my invention;

Fig. 2 is a plan view of the blank from which a part of the magazine is formed;

Fig. 3 is a plan view of one section of a film container;

Fig. 4 is an enlarged fragmentary view showing a portion of a light-tight channel leading to a film container;

Fig. 5 is an end view of the light-tight channel for the film containers;

Fig. 6 is a view of the blank from which the light-tight channel for the film containers is folded;

Fig. 7 is a side elevation of a second section of a film container; and

Fig. 8 is a section through the magazine shown in Fig. 1 taken on line 7—7 thereof with parts of a camera diagrammatically shown.

A preferred form of my film magazine comprises a base plate which may consist of a thin sheet metal plate 1 having perforations 2 and 3 for the film winding and supporting mechanism to be hereinafter more fully described and having perforations 4 through which lugs 5 of the outer section 6 of the film container may pass so as to attach the film containers permanently in place by bending the lugs 5 flat against the bottom 7 of the plate as best shown in Fig. 8.

The plate 1 may be made of comparatively thin sheet metal and if it is necessary to strengthen this plate a flange 8 may be provided, which, as indicated in Fig. 2, may be bent upwardly along the line 9 to reinforce the plate 1. However, this flange is not necessary.

The film containers are similar in shape and consist in two parts. An inner part 10 is shown in Fig. 3 as consisting of a disc 11 which may have formed up members 12 in the bottom to reinforce the metal and to facilitate positioning a coil of film. From the periphery of the bottom 11 a flange 13 extends upwardly, this flange being provided with a pair of spaced, outwardly bent ends 14 and 15 forming tracks on which cooperating flanges 16 and 17 of the light-tight channel 18 may slide. This channel is made light-tight by means of plush or other pile fabric 19 which is preferably dark in color or black. As indicated in Fig. 3 a small section 20 of the fabric is placed on the lower wall 11 of the magazine.

In order to hold section 10 of the film container in place a second section 6 is provided as shown in Fig. 7, this section consisting of an upper wall 21 from which there is a downwardly extending flange 22 of such size that it telescopes flange 13 of section 10. This member has a cut-away portion 23 in one side to permit the light-tight channel 18 to extend to section 10 and the flange 22 is preferably provided with a pair of lugs 5, these lugs being adapted to enter the slots 4 and to be folded over against the bottom 7 of plate 1 to hold the film magazine in place.

As indicated in Fig. 1 the film containers designated broadly as C and C¹ are similar in structure except as to the location of the light-tight channels 18. Two of these are mounted on each plate 1 and it should be noted that the edges of the plate extend out beyond the edges of the cylindrical film containers.

The reason for this construction is that the plate 1 is provided with at least two edges 24 and 25 which in the preferred form shown are parallel to each other and are adapted to engage walls of a camera to position the magazine therein.

For instance, a preferred form of locating means is shown in Fig. 8 wherein the edges 24 and 25 are adapted to slide in the grooves 26 and 27, thus fixedly holding the magazine in a desired position in a camera.

It is, of course, possible to locate the plate 1 in a camera by the walls 24, 25, 26 and 29 as the camera may have an opening adapted to receive such a plate.

In both cases my magazine has the advantage that it may be easily placed into and taken out of a camera. The reason for this is as follows: Normally both walls of a magazine are of substantially the same size and shape and where this is true and the magazine fits closely into a camera, it is difficult to get a hold of the magazine to remove it.

However, it will be noticed that with a magazine as shown in the accompanying drawing one side of the magazine in effect consists of a flat plate 1 which is considerably larger than the other side of the magazine which consists of the top walls of the film containers C and C¹ thus even if the plate 1 does fit accurately into an opening there is left plenty of room in the outer wall of the magazine, that is, the outer walls of C and C¹ by which an operator may grasp one of the film containers or both to readily remove the magazine from the camera.

In Fig. 6 I have shown a blank of metal from which a light-tight channel 18 may be folded up. This consists of a pair of dissimilar walls 30 and 31 connected by a narrow wall 32. Walls 30 and 31 are bent along the lines 33 and 34 into substantially parallel relation. Flaps 35 and 36 may be bent along the lines 37 and 38 to hold the plush or material 19 at one end. The flanges 16 and 17 which engage the cooperating flanges 14 and 15 on the film containers are folded from the ends of parts 30 and 31 by folding the metal in a plurality of folds along the lines shown at 39 and 40.

As indicated in Fig. 8 each spool container is provided with a hub for the film. Normally spool container C is for the supply of unexposed film and this may be wound upon a hub member 41 adapted to turn freely upon the upturned flange 42 of section 10 of the spool container. This hub does not necessarily have power applied to it and may turn freely after the film F is moved by the camera mechanism.

Spool container C¹ is normally to receive the exposed film and may be power driven by means of a shaft 43, this shaft extending into the aperture 44 and having a driving engagement therewith through a clutch member 43' and 44' so as to turn the spool hub 45 to which the film may be affixed by a metal sleeve 46. As the mounting of the supply and take-up reel in this magazine forms no part of my invention, it will not be further described except to state that it may be of any well known type of film supporting mechanism.

While I have described a preferred embodiment of my invention obviously other embodiments can be constructed to come within the scope of my invention so that I contemplate as within the scope of my invention all such forms as may come within the terms of the appended claims.

Having thus described my invention, what I claim as new and desire to secure by Letters Patent is:

1. In a double film magazine, the combination with a flat plate, of a pair of film containers each including an inner cup-shaped member and an outer cup-shaped member which is affixed to said plate, said cup-shaped members in each pair telescoping one with the other in light-tight and inverted relation.

2. In a double film magazine, the combination with a flat plate, of a pair of film containers each including an inner cup-shaped member and an outer cup-shaped member which is affixed to said plate, said cup-shaped members in each pair telescoping one with the other in light-tight and inverted relation and a light-tight channel attached to each inner cup-shaped member and passing through a cutaway portion in each outer cup-shaped member.

3. The combination with a motion picture camera provided with a magazine chamber and having a plurality of guideways therein, of a double film magazine including a supporting plate and a pair of cup-shaped film containers affixed thereto, said plate extending beyond said film containers and having edges which are adapted to engage said guideways in the camera.

4. The combination with a motion picture camera provided with a magazine chamber and having a plurality of guideways therein, of a double film magazine including a supporting plate, a pair of cup-shaped film containers affixed thereto, and a light-tight channel extending from each film container, said supporting plate extending in a flat plane beyond said film containers and said channels and having edges which are adapted slidably to engage said guideways in the camera.

5. In a motion picture camera which is provided with a magazine chamber, the combination with a mechanism plate located in the camera and forming one side of said magazine chamber, and a guideway within said chamber and extending parallel to said mechanism plate, of a film magazine including a film container which has side walls and lateral walls, and a guide member on said magazine extending beyond said lateral walls in a plane parallel to said side walls of the film container, and for slidably engaging the guideway of the camera during edgewise movement of the film magazine within said magazine chamber.

6. In a motion picture camera which is provided with a magazine chamber, the combination with a mechanism plate located in the camera and forming one side of said magazine chamber, and a guideway within said chamber and extending parallel to said mechanism plate, of a film magazine including a container for film and including a supporting plate attached to one side of said container and extending beyond the edges of said container to form along the edge of said supporting plate a guide member which is adapted slidably to engage the guideway of the camera during edgewise movement of the film magazine within said magazine chamber.

HOWARD A. SAUER.